(12) United States Patent
Yokoi

(10) Patent No.: US 8,875,104 B2
(45) Date of Patent: Oct. 28, 2014

(54) EFFICIENTLY DEVELOPING SOFTWARE USING TEST CASES TO CHECK THE CONFORMITY OF THE SOFTWARE TO THE REQUIREMENTS

(75) Inventor: Atsushi Yokoi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 13/273,478

(22) Filed: Oct. 14, 2011

(65) Prior Publication Data

US 2012/0117545 A1 May 10, 2012

(30) Foreign Application Priority Data

Nov. 9, 2010 (JP) .................. 2010-251326

(51) Int. Cl.
*G06F 9/45* (2006.01)
*G06F 11/00* (2006.01)
*G06F 11/36* (2006.01)

(52) U.S. Cl.
CPC ........ *G06F 11/3684* (2013.01); *G06F 11/3624* (2013.01)
USPC ............. 717/124; 717/106; 717/110; 714/38; 714/703

(58) Field of Classification Search
USPC .................... 717/107, 126, 38, 703
See application file for complete search history.

(56) References Cited

U.S. PATENT DOCUMENTS

| | | | | |
|---|---|---|---|---|
| 4,819,233 A | * | 4/1989 | Delucia et al. ................. | 717/129 |
| 5,737,609 A | * | 4/1998 | Reed et al. ..................... | 717/126 |
| 6,907,546 B1 | * | 6/2005 | Haswell et al. ............ | 714/38.11 |
| 7,197,417 B2 | | 3/2007 | Pramanick et al. | |
| 7,325,227 B2 | * | 1/2008 | Henderson et al. ........... | 717/126 |
| 7,392,507 B2 | * | 6/2008 | Kolawa et al. ................ | 717/124 |
| 7,603,658 B2 | * | 10/2009 | Subramanian et al. ....... | 717/126 |
| 7,665,066 B2 | | 2/2010 | Sauer et al. | |
| 7,721,253 B2 | * | 5/2010 | Tatsumi et al. ............... | 717/106 |
| 7,934,209 B2 | | 4/2011 | Zimmer et al. | |
| 2003/0192032 A1 | | 10/2003 | Andrade et al. | |

(Continued)

FOREIGN PATENT DOCUMENTS

| | | |
|---|---|---|
| JP | 1993250213 | 9/1993 |
| JP | 06-332749 A | 12/1994 |

(Continued)

OTHER PUBLICATIONS

Office Action for U.S. Appl. No. 13/410,000 dated Nov. 19, 2013, pp. 1-31.

(Continued)

*Primary Examiner* — Don Wong
*Assistant Examiner* — Mohammad Kabir
(74) *Attorney, Agent, or Firm* — Winstead, P.C.

(57) ABSTRACT

A method, system and computer program product for efficiently developing software and supporting creation of source code so as to develop software that meets the requirements. A plurality of test cases defining a plurality of respective tests to be executed to check the conformity of the software to the requirements are used. In a test execution step, one or more specific test cases selected from the plurality of test cases are executed or the specific test cases are caused to be executed. Furthermore, a test result of a test case executed or caused to be executed in the test case execution step is added to the source code.

20 Claims, 16 Drawing Sheets

(56) References Cited

U.S. PATENT DOCUMENTS

| | | | |
|---|---|---|---|
| 2007/0250810 A1* | 10/2007 | Tittizer et al. | 717/110 |
| 2007/0294671 A1 | 12/2007 | Demetriou et al. | |
| 2009/0158256 A1* | 6/2009 | Ponsford et al. | 717/125 |
| 2011/0161938 A1* | 6/2011 | Marum et al. | 717/131 |

FOREIGN PATENT DOCUMENTS

| | | |
|---|---|---|
| JP | 1995141170 | 6/1995 |
| JP | 1996272649 | 10/1996 |
| JP | 08-297569 A | 11/1996 |
| JP | 1998214204 | 8/1998 |
| JP | 2000-339192 A | 12/2000 |
| JP | 2003280944 | 10/2003 |
| JP | 2004070561 | 3/2004 |
| JP | 2007102380 | 4/2007 |
| JP | 2007-193586 A | 8/2007 |
| JP | 2008129661 | 6/2008 |
| JP | 2009032133 | 2/2009 |

OTHER PUBLICATIONS

Office Action for U.S. Appl. No. 13/410,000 dated Apr. 29, 2013.
Office Action for U.S. Appl. No. 13/410,000 dated Apr. 22, 2014, pp. 1-18.

* cited by examiner

EFFICIENTLY DEVELOPING SOFTWARE USING TEST CASES TO CHECK THE CONFORMITY OF THE SOFTWARE TO THE REQUIREMENTS

CROSS-REFERENCE TO RELATED APPLICATIONS

This application claims priority under 35 U.S.C. §119(a) from Japanese Patent Application No. 2010251326, filed on Nov. 9, 2010, the contents of which are incorporated herein by reference.

TECHNICAL FIELD

The present invention relates to software development, and more particularly, to efficiently developing software using test cases to check the conformity of the software to the requirements.

BACKGROUND

Software development is performed to control an object to be controlled using a computer. A mechanism meeting requirements is implemented by installing software in a computer. System design is performed by analyzing customer requirements, preparing a software requirements specification, and developing software. After confirming, by tests, that the software meets the requirements, the software is installed in a computer. Recently, as the scale of software has become large, much manpower has become necessary for testing.

Software is divided into many routines, and each of the routines is developed. Many routines may constitute a multi-layered hierarchical structure. In testing software, the following tests are executed in stages in sequence: a small-scale unit test, a medium-scale functional test, and a large-scale integration test.

A unit test is executed in a small-scale system in which a few routines are combined. For example, an in-out test checks whether a routine produces a correct output upon a correct input as designed.

A functional test is executed in a medium-scale system in which more routines are combined. For example, a check is made, by executing a routine, as to whether the routine behaves exactly as designed.

An integration test is executed in a large-scale system in which medium-scale systems are combined. For example, a joint test is executed.

In any test stage, a careful test is executed. When software functions in a manner that does not meet requirements, the source code of a program is corrected, and another test is executed to check whether the software meets the requirements.

Moreover, after software is determined as meeting requirements, the requirements may change. In such a case as well, the source code of a program is corrected, and another test is executed to check whether the software meets the requirements.

In the foregoing operations, hitherto, when creating or changing source code, a tester has found a related test in a test management tool, executed the test, and recorded the test results in the test management tool. A software developer has individually found the relation between a specific change in the source code and the test result and corrected the source code.

Thus, it has been difficult to improve the efficiency of software development.

BRIEF SUMMARY

In one embodiment of the present invention, a method for supporting creation of source code including a plurality of routines described in a program, using a plurality of test cases defining a plurality of respective tests to be executed to check conformity of software to requirements, comprises a test case execution step of executing one or more specific test cases selected from the plurality of test cases or causing the specific test cases to be executed. The method further comprises a test result output step of adding, by a processor, a test result of a test case executed or caused to be executed in the test case execution step to the source code.

Other forms of the embodiment of the method described above are in a computer program product and in a system.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
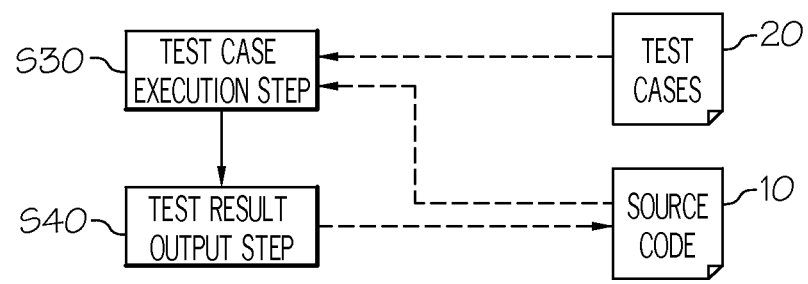
FIG. 1 is an illustration of the procedure of a software development support method according to a first embodiment of the present invention.

As described herein, a software development support method, a software development support apparatus, and a software development support program according to the present invention achieve the following advantageous effects via the components.

A plurality of test cases defining a plurality of respective tests are prepared, a test case selected from the plurality of test cases is executed or caused to be executed, and the result of executing the test is added to the source code. Thus, the test result can be checked by seeing the source code having been tested.

Moreover, a plurality of test cases in association with a plurality of respective pieces of test object location information assigned to a plurality of respective routines are prepared, a specific test case in association with the test object location information that can identify a specific routine is executed or caused to be executed, and the test result is added to a program description field defining the specific routine. Thus, related test results can be checked by seeing the program description field of source code having been tested.

Moreover, a program description field defining a specific routine includes a specific comment line including a marker, and the specific routine can be identified in source code on the basis of the specific test object location information. Thus, the specific routine, including the specific comment line, can be found using the marker as a mark, and the specific test object location information can be found from a single character string or the combination of a plurality of character strings that can identify the specific routine.

Moreover, the respective test results of specific test cases are added to specific comment lines of the program description field of a specific routine. Thus, the conformity of software to requirements attributable to the specific routine can be checked from the test results added to the specific comment lines.

Moreover, a specific test case, in association with a higher-level specific test object location information that can identify a higher-level routine, calling a specific routine is executed or caused to be executed. Thus, the conformity of software to requirements attributable to the higher-level routine can be checked.

Moreover, a specific comment line includes specific supplementary information regarding a test, and specific test cases are executed or caused to be executed according to the specific supplementary information. Thus, a test condition can be controlled via the specific supplementary information in the specific comment line.

Moreover, a specific comment line is added to a portion of source code where a difference lies between the two different versions of the source code. Thus, the conformity of software to requirements attributable to a rewritten program of the software can be checked.

Moreover, a plurality of test cases in association with a plurality of respective pieces of test object location information assigned to a plurality of respective routines are prepared, a specific test case in association with test object location information assigned to a specific routine is executed or caused to be executed, the test result is output in relation to the specific routine, and the result of executing the test is added to the source code related to the test. Thus, the test results related to the source code having been tested can be checked.

Moreover, a program description field defining a specific routine includes a specific comment line including a marker, and the specific routine can be identified in source code on the basis of specific test object location information. Thus, the specific routine including the specific comment line can be found using the marker as a mark, and the specific test object location information can be found from a single character string or the combination of a plurality of character strings that can identify the specific routine.

Moreover, a specific test case in association with higher-level specific test object location information that can identify a higher-level routine calling a specific routine is executed or caused to be executed. Thus, the conformity of software to requirements attributable to the higher-level routine can be checked.

Moreover, a specific comment line includes specific supplementary information regarding a test, and specific test cases are executed or caused to be executed according to the specific supplementary information. Thus, a test condition can be controlled via the specific supplementary information in the specific comment line.

Moreover, a specific comment line is added to a portion of source code where a difference lies between the two different versions of the source code. Thus, the conformity of software to requirements attributable to a rewritten program of the software can be checked.

Thus, a software development support method, a software development support apparatus, and a software development support program for efficiently developing software can be provided.

A software development support method according to an embodiment of the present invention will first be described.

FIG. 1 is an illustration of the procedure of the software development support method according to an embodiment of the present invention.

Referring to FIG. 1, the software development support method according to an embodiment of the present invention is a method for supporting the creation of source code including a plurality of routines described in a program, using a plurality of test cases defining a plurality of respective tests to be executed to check the conformity of the software to the requirements.

In this case, a routine represents software defined in a block of program description that performs a predetermined function in the program description field of the source code. A plurality of routines may constitute a hierarchical structure.

Test cases 20 define a plurality of respective tests to be executed to check the conformity of the software to the requirements. The test cases 20 are prepared in a manual manner and/or an automated manner.

Source code 10 includes a plurality of routines described in a program. The source code 10 is prepared in a manual manner and/or an automated manner.

The plurality of test cases 20 may be associated with a plurality of respective pieces of test object location information that can identify a plurality of respective routines in the source code. For example, test object location information is a program name, a file name, a method name, a user-defined method name, a subroutine name, a program line number, or the like, or the combination of them.

A program description field defining a routine may include a specific comment line that is a comment line including a marker that is a specific character string. Such a routine is called a specific routine.

Specific test object location information may include a single character string or the combination of a plurality of character strings that are selected from the description of a specific routine and can identify the specific routine in source code.

A specific comment line may include specific supplementary information regarding a test. For example, specific supplementary information is a parameter of a test.

The software development support method according to an embodiment of the present invention includes a test case execution step S30 and a test result output step S40.

The software development support method according to an embodiment of the present invention may include a marker addition step S10 (discussed later herein in connection with FIG. 4), the test case execution step S30, and the test result output step S40.

The test case execution step S30 is a step of executing one or more specific test cases selected from a plurality of test cases or causing the specific test cases to be executed. The test case execution step S30 may execute one or more specific test cases selected from a plurality of test cases. The test case execution step S30 may cause one or more specific test cases selected from a plurality of test cases to be executed. For example, the test case execution step S30 executes a part of one or more specific test cases selected from a plurality of test cases and instructs a tester to execute the other part.

Moreover, the test case execution step S30 may execute one or more specific test cases selected from a plurality of test cases or cause the specific test cases to be executed. A specific test case is a test case in association with specific test object location information that is test object location information that can identify a specific routine out of a plurality of routines. That is, a specific test case is a test case in association with specific test object location information. Specific test object location information is test object location information that can identify a specific routine in source code.

A specific routine is a specific routine out of a plurality of routines. A specific routine includes a specific comment line including a marker in the program description field thereof. In this arrangement, a specific routine including a specific comment line including a marker can be found, a specific test case in association with specific test object location information that can identify the found specific routine can be selected using the specific test object location information, and then, the selected specific test case can be executed, or a tester can be caused to execute the selected specific test case.

Moreover, the test case execution step S30 may execute a higher-level specific test case that is a test case in association with higher-level specific test object location information that is test object location information assigned to a higher-level routine that is a routine calling a specific routine or cause the higher-level specific test case to be executed.

Moreover, the test case execution step S30 may execute a specific test case or cause the specific test case to be executed according to specific supplementary information. For example, specific supplementary information is a parameter of a test. Moreover, for example, specific supplementary information is information for selecting a test case from a plurality of test cases in association with specific test object location information.

The test result output step S40 is a step of adding the test result of a test case executed or caused to be executed in the test case execution step S30 to source code.

Moreover, the test result output step S40 may output, in relation to a specific routine identified by test object location information in association with a specific test case, the test result of the specific test case executed or caused to be executed in the test case execution step S30. For example, the test result output step S40 outputs the test result of a specific test case in combination with specific test object location information in association with the specific test case.

Moreover, the test result output step S40 may add the test result of a specific test case executed in the test case execution step S30 to the program description field of a specific routine identified by test object location information in association with the specific test case. For example, the test result of a specific test case is appended in a specific comment line of a program description field defining a specific routine. For instance, the test result of a specific test case is added in a line following a specific comment line of a program description field defining a specific routine.

The marker addition step S10 (discussed further below in connection with FIG. 4) is a step of adding a specific comment line including a marker to a portion of the program description field of source code where a difference lies by comparing two different versions of the source code.

A software development support method according to another embodiment of the present invention will next be described in connection with FIG. 2.

Figure 2:
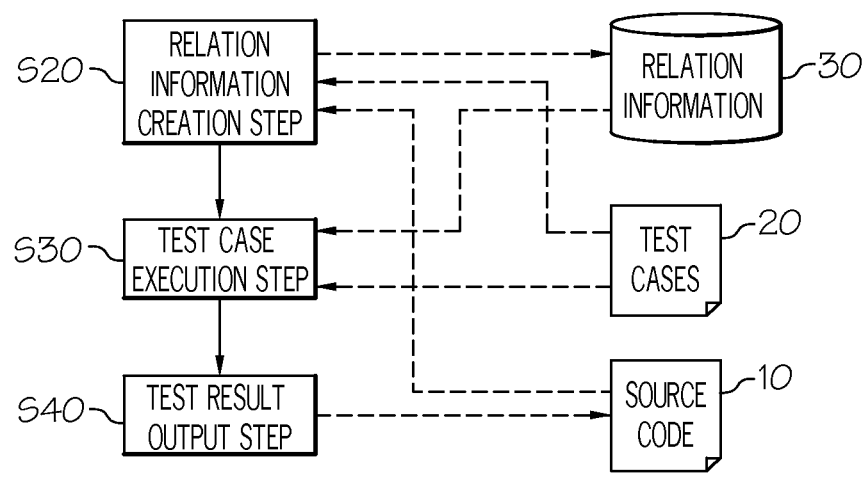
FIG. 2 is an illustration of the procedure of a software development support method according to a second embodiment of the present invention.

FIG. 2 is an illustration of the procedure of the software development support method according to another embodiment of the present invention.

In the following description, the explanation of the same points as those in the software development support method according to the embodiment discussed in connection with FIG. 1 is omitted, and different points will be explained.

Referring to FIG. 2, the software development support method according to another embodiment of the present invention includes a relation information creation step S20, the test case execution step S30, and the test result output step S40.

The relation information creation step S20 is a step of preparing relation information 30 from the source code 10 and the plurality of test cases 20.

The relation information 30 is prepared from the source code 10 and the test cases 20. For example, the relation information 30 has a data structure in which each of a plurality of specific comment lines found in the program description field of the source code 10 is associated with specific test object location information, supplementary information, and selected test cases.

Specific test object location information represents information that can identify a routine including a specific comment line out of a plurality of routines included in the source code.

Specific test object location information may include a single character string or the combination of a plurality of character strings that are selected from the description of a specific routine and can identify the specific routine in the source code.

A specific comment line is a comment line including a marker that is a specific character string.

For example, a marker is "TESTME".

For example, a specific comment line is "//TESTME abc". In this case, "//" at the top of the text is a program language indicating a comment line.

For example, specific test object location information is a file name, a program name, a method name, a subroutine name, a line number, or the like, or the combination of them.

For example, "abc" is supplementary information. Supplementary information is information included in a specific comment line. Supplementary information is a parameter of a test, the name of a programmer, a deadline until which a test result is required, or the like, or the combination of them. Moreover, supplementary information may be information for selecting a specific test case to be executed from a plurality of test cases to which specific test object location information is related.

Selected test cases are a specific test case and a higher-level specific test case. A specific test case is one or more test cases out of a plurality of test cases defining a plurality of respective tests to be executed to check the conformity of software to the requirements. A specific test case may be one or more test cases in association with test object location information for identifying software including a specific comment line.

A higher-level specific test case is a test case in association with higher-level specific test object location information that is test object location information assigned to a higher-level routine that is a routine calling a specific routine.

The test case execution step S30 is a step of executing one or more specific test cases selected from a plurality of test cases or causing the specific test cases to be executed. The test case execution step S30 may execute a test defined in one or more specific test cases selected from a plurality of test cases. The test case execution step S30 executes a test defined in selected one or more specific test cases referring to the relation information 30.

The test case execution step S30 reads the test cases 20 and the relation information 30 and executes actual tests. The procedure of executing a test varies with the content of the test. For example, when the procedure of entering a character string "B" in an input field A is manually performed, a manual test is executed. When the procedure of entering a numeric value "C" in the input field A is defined in a program (hereinafter called a test case dedicated program), the test case dedicated program is executed. For example, when all the test cases 20 are defined in a test case dedicated program, all tests are automatically executed by a computer.

The test case execution step S30 reads the test cases 20 and executes tests. Then, the test result output step S40 described below adds the test result to a specific comment line in the source code 10 referring to the relation information 30.

Since the other details of the test case execution step S30 are the same as those of the test case execution step S30 in the software development support method discussed in connection with FIG. 1, the description of the other details is omitted.

The test result output step S40 is a step of adding the test result of a test case executed or caused to be executed in the test case execution step S30 to source code.

Since the details of the test result output step S40 are the same as those of the test result output step S40 in the software development support method discussed in connection with FIG. 1, the description of the details is omitted.

A software development support method according to a third embodiment of the present invention will next be described referring to the drawing.

Figure 3:
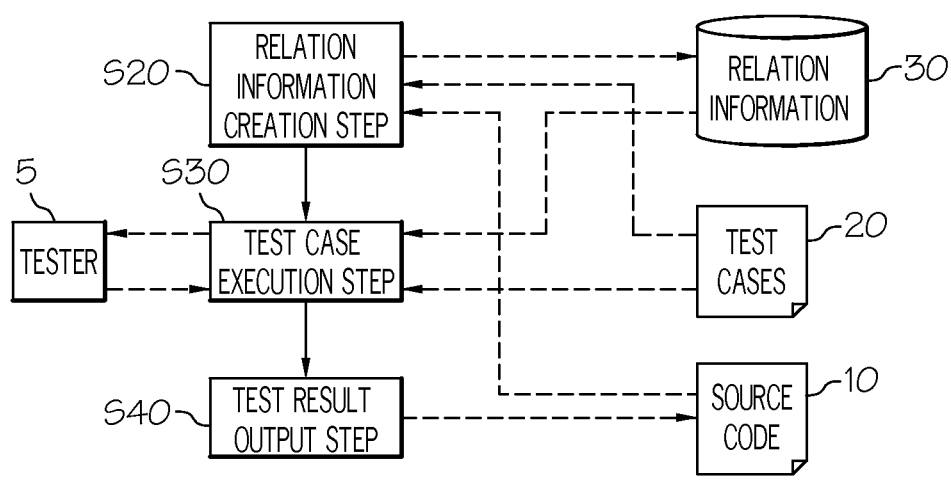
FIG. 3 is an illustration of the procedure of a software development support method according to a third embodiment of the present invention.

FIG. 3 is an illustration of the procedure of the software development support method according to a further embodiment of the present invention.

In the following description, the explanation of the same points as those in the respective software development support methods discussed in connection with FIGS. 1 and 2 is omitted, and different points will be explained.

Referring to FIG. 3, the software development support method according to a further embodiment of the present invention includes the relation information creation step S20, the test case execution step S30, and the test result output step S40.

The relation information creation step S20 is a step of preparing the relation information 30 from the source code 10 and the plurality of test cases 20. Since the details of the relation information creation step S20 are the same as those of the relation information creation step S20 in the software development support method discussed in connection with FIG. 2, the description of the details is omitted.

The test case execution step S30 is a step of executing one or more specific test cases selected from a plurality of test cases or causing the specific test cases to be executed. The test case execution step S30 may cause a test defined in one or more specific test cases selected from a plurality of test cases to be executed. The test case execution step S30 causes a test defined in selected one or more specific test cases to be executed, referring to the relation information 30.

According to the procedure defined in the selected one or more specific test cases, the test case execution step S30 indicates the test procedure to a tester 5 and causes the tester 5 to enter the test result. For example, the tester 5 is a person who evaluates a test. In another example, the tester 5 evaluates image data and sound data generated by executing a program using human sense, such as visual sense and hearing sense, and returns the evaluation result. In a further example, the tester 5 has an emulator simulating the operations of an object to be controlled or an object to be controlled by a program. In an additional example, the tester 5 causes the emulator to operate according to the test procedure and returns the result of the operation.

Since the other details of the test case execution step S30 are the same as those of the test case execution step S30 in the software development support method as discussed in connection with FIG. 1, the description of the other details is omitted.

The test result output step S40 is a step of adding the test result of a test case executed or caused to be executed in the test case execution step S30 to source code. Since the details of the test result output step S40 are the same as those of the test result output step S40 in the software development support method as discussed in FIG. 1, the description of the details is omitted.

A software development support method according to a further embodiment of the present invention will next be described referring to the drawing.

Figure 4:
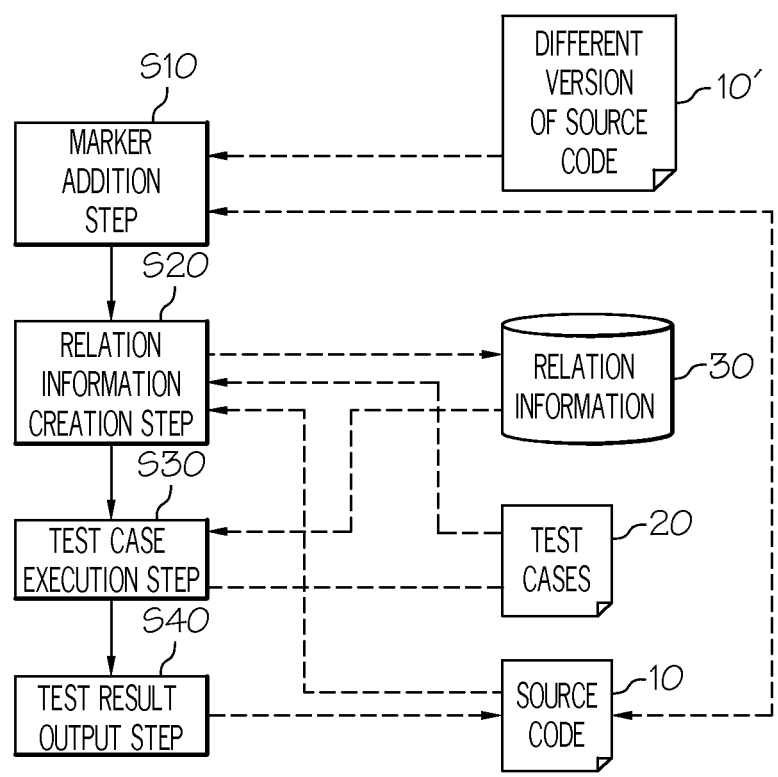
FIG. 4 is an illustration of the procedure of a software development support method according to a fourth embodiment of the present invention.

FIG. 4 is an illustration of the procedure of the software development support method according to a further embodiment of the present invention.

In the following description, the explanation of the same points as those in the respective software development support methods as discussed in FIGS. 1 and 2 is omitted, and different points will be explained.

Referring to FIG. 4, the software development support method according to a further embodiment of the present invention includes the marker addition step S10, the relation information creation step S20, the test case execution step S30, and the test result output step S40.

The marker addition step S10 is a step of adding a specific comment line including a marker to a portion of the program description field of the source code 10 where a difference lies by comparing two different versions of the source code 10'.

Moreover, the marker addition step S10 may add a specific comment line including a marker to the program description field of a routine including a portion of the program description field of the source code 10 where a difference lies by comparing two different versions of the source code 10'.

Moreover, the marker addition step S10 may display a portion of the program description field of the source code 10 where a difference lies by comparing two different versions of the source code 10', determine a specific routine by interacting with a programmer, and add a specific comment line including a marker to the program description field of the determined specific routine. For example, the marker addition step S10 may display a portion of the program description field of the source code 10 where a difference lies by comparing two versions of the source code 10', i.e., a version to be tested and the previous version, determine a specific routine by interacting with a programmer, and add a specific comment line including a marker to the program description field of the determined specific routine.

Since the relation information creation step S20, the test case execution step S30, and the test result output step S40 are the same as those in the respective software development support methods as discussed in connection with FIGS. 2 and 3, the description of these steps is omitted.

A software development support program according to an embodiment of the present invention will next be described in connection with FIG. 5.

Figure 5:
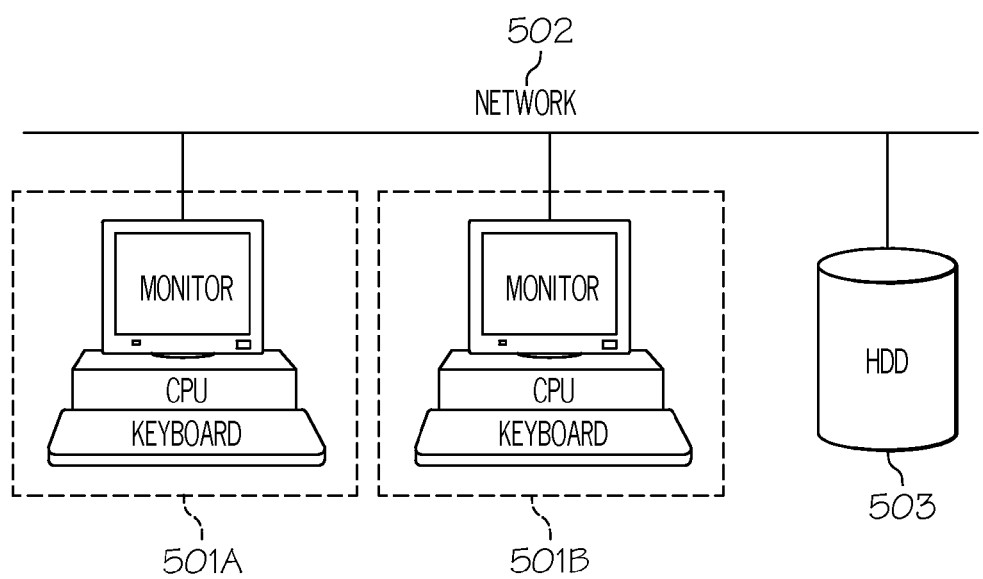
FIG. 5 is a configuration diagram of a software development support apparatus according to any of the embodiments of the present invention.
Figure 6:
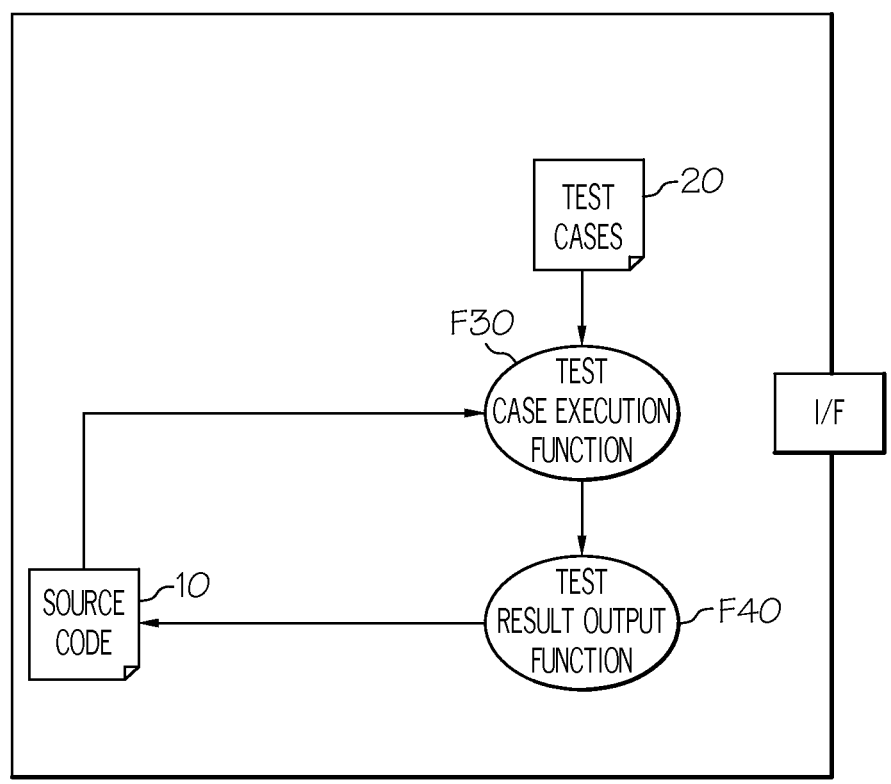
FIG. 6 is a functional block diagram of a software development support program according to the first embodiment of the present invention.

FIG. 5 is a configuration diagram of a software development support apparatus according to an embodiment of the present invention. FIG. 6 is a functional block diagram of the software development support program according an embodiment of the present invention.

Referring to FIG. 5, the software development support apparatus according to an embodiment of the present invention includes a computer or an electric circuit. The software development support apparatus according to the embodiment of the present invention may include a plurality of computers 501A, 501B, a network 502, and an external storage unit 503 (e.g., hard disk drive (HDD)). Computers 501A, 501B may collectively or individually be referred to as computers 501 or computer 501, respectively. The software development support apparatus may include any number of computers 501 and it is not to be limited in scope to the elements depicted in FIG. 5.

One of the computers 501 prepares source code or a plurality of test cases. Another one of the computers 501 executes the tests and outputs the test results.

The external storage unit 503 is a unit storing source code and a plurality of test sets. Moreover, the external storage unit 503 is a unit storing data. The external storage unit 503 stores source code, a plurality of test sets, and relation information.

The network 502 enables data communications between the plurality of computers 501 and the external storage unit 503.

The software development support apparatus according to the embodiment of the present invention includes test case execution means and test result output means.

The software development support apparatus according to the embodiment of the present invention may include relation information creation means, the test case execution means, and the test result output means.

The software development support apparatus according to the embodiment of the present invention may include marker addition means, the relation information creation means, the test case execution means, and the test result output means.

The software development support program according to an embodiment of the present invention is a program for supporting creation of source code including a plurality of routines described in a program, using a plurality of test cases defining a plurality of respective tests to be executed to check the conformity of the software to the requirements.

Referring to FIG. 6, the test cases 20 define a plurality of respective tests to be executed to check the conformity of the software to the requirements. The test cases 20 are prepared in a manual or automated manner.

The source code 10 includes a plurality of routines described in a program. The source code 10 is prepared in a manual or automated manner. The plurality of test cases 20 may be associated with a plurality of respective pieces of test object location information that can identify a plurality of respective routines in the source code. For example, test object location information is a program name, a file name, a method name, a user-defined method name, a subroutine name, a program line number, or the like, or the combination of them.

A program description field defining a routine may include a specific comment line that is a comment line including a marker that is a specific character string. Such a routine is called a specific routine. Specific test object location information may include a single character string or the combination of a plurality of character strings that are selected from the description of a specific routine and can identify the specific routine in the source code.

A specific comment line may include specific supplementary information regarding a test. For example, specific supplementary information is a parameter of a test.

The software development support program according to an embodiment of the present invention causes a computer to implement a test case execution function F30 and a test result output function F40.

The software development support program according to an embodiment of the present invention may cause a computer to implement a marker addition function F10 (discussed further below in connection with FIG. 9), the test case execution function F30, and the test result output function F40.

The test case execution function F30 is a function of executing one or more specific test cases selected from a plurality of test cases or causing the specific test cases to be executed. The test case execution function F30 may execute one or more specific test cases selected from a plurality of test cases. The test case execution function F30 may cause one or more specific test cases selected from a plurality of test cases to be executed. Moreover, the test case execution function F30 may execute one or more specific test cases selected from a plurality of test cases or cause the specific test cases to be executed.

A specific test case is a test case in association with specific test object location information that is test object location information that can identify a specific routine out of a plurality of routines. That is, a specific test case is a test case in association with specific test object location information. Specific test object location information is test object location information that can identify a specific routine in the source code. A specific routine is a specific routine out of a plurality of routines. A specific routine includes a specific comment line including a marker in the program description field thereof.

In this arrangement, a specific routine including a specific comment line including a marker can be found, a specific test case in association with specific test object location information that can identify the found specific routine can be selected using the specific test object location information, and then, the selected specific test case can be executed, or a tester can be caused to execute the selected specific test case.

Moreover, the test case execution function F30 may execute a higher-level specific test case that is a test case in association with higher-level specific test object location information that is test object location information assigned to a higher-level routine that is a routine calling a specific routine or cause the higher-level specific test case to be executed.

Moreover, the test case execution function F30 may execute a specific test case or cause the specific test case to be executed according to specific supplementary information. For example, specific supplementary information is a parameter of a test.

The test result output function F40 is a function of adding the test result of a test case executed or caused to be executed in the test case execution function F30 to source code.

Moreover, the test result output function F40 may output, in relation to a specific routine identified by test object location information in association with a specific test case, the test result of the specific test case executed or caused to be executed in the test case execution function F30. For example, the test result output function F40 outputs the test result of a specific test case in combination with specific test object location information in association with the specific test case.

Moreover, the test result output function F40 may add the test result of a specific test case executed in the test case execution function F30 to the program description field of a specific routine identified by test object location information in association with the specific test case.

For example, the test result of a specific test case is appended in a specific comment line of a program description field defining a specific routine. In another example, the test result of a specific test case is added in a line following a specific comment line of a program description field defining a specific routine.

The marker addition function F10 (discussed further below in connection with FIG. 9) is a function of adding a specific comment line including a marker to a portion of the program description field of source code where a difference lies by comparing two different versions of the source code.

A software development support program according to another embodiment of the present invention will next be described in connection with FIG. 7.

Figure 7:
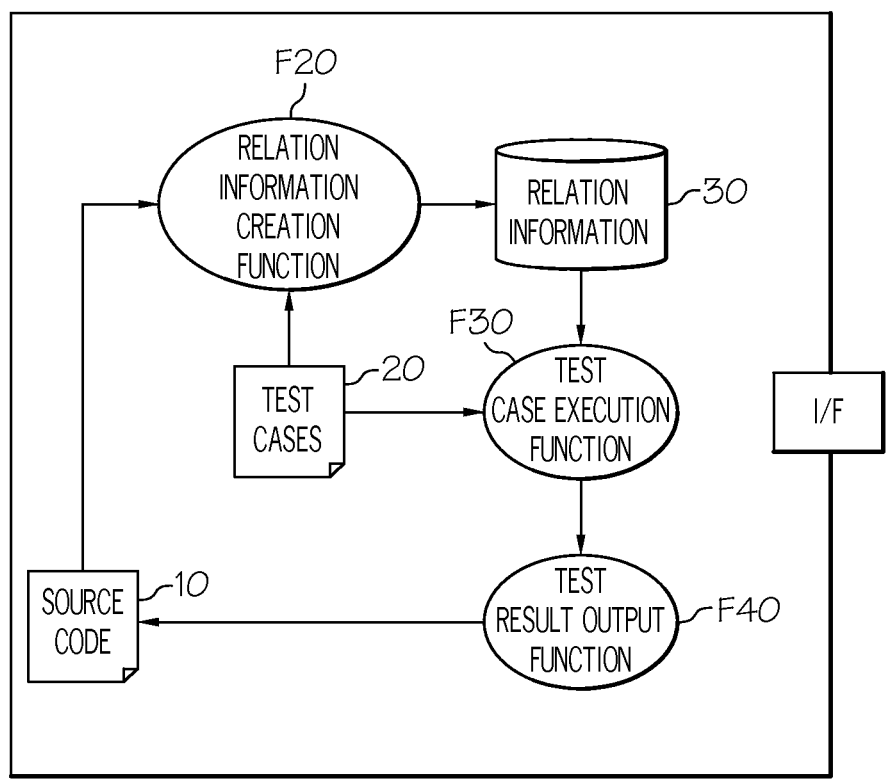
FIG. 7 is a functional block diagram of a software development support program according to the second embodiment of the present invention.

FIG. 7 is a functional block diagram of the software development support program according to another embodiment of the present invention.

In the following description, the explanation of the same points as those in the software development support program as discussed in connection with FIG. 6 is omitted, and different points will be explained.

Referring to FIG. 7, the software development support program according to another embodiment of the present invention causes a computer to implement a relation information creation function F20, the test case execution function F30, and the test result output function F40.

The relation information creation function F20 is a function of preparing the relation information 30 from the source code 10 and the plurality of test cases 20. The relation information 30 is prepared from the source code 10 and the test cases 20. For example, the relation information 30 has a data structure in which each of a plurality of specific comment lines found in the program description field of the source code 10 is associated with specific test object location information, supplementary information, and selected test cases.

Specific test object location information represents information that can identify a routine, including a specific comment line out of a plurality of routines included in the source code. Specific test object location information may include a single character string or the combination of a plurality of character strings that are selected from the description of a specific routine and can identify the specific routine in source code.

A specific comment line is a comment line including a marker that is a specific character string.

For example, a marker is "TESTME".

For example, a specific comment line is "//TESTME abc". In this case, "//" is a program language indicating a comment line.

For example, specific test object location information is a file name, a program name, a method name, a subroutine name, a line number, or the like, or the combination of them.

For example, "abc" is supplementary information. Supplementary information is information included in a specific comment line. Supplementary information is a parameter of a test, the name of a programmer, a deadline until which a test result is required, or the like, or the combination of them. Supplementary information is information for selecting a specific test case to be executed from a plurality of specific test cases in association with specific test object location information.

Selected test cases are a specific test case and a higher-level specific test case. A specific test case is one or more test cases out of a plurality of test cases defining a plurality of respective tests to be executed to check the conformity of the software to the requirements. A specific test case may be one or more test cases in association with test object location information for identifying software including a specific comment line. The specific test case is a test case in association with higher-level specific test object location information that is test object location information assigned to a higher-level routine that is a routine calling a specific routine.

The test case execution function F30 is a function of executing one or more specific test cases selected from a plurality of test cases or causing the specific test cases to be executed. The test case execution function F30 may execute a test defined in one or more specific test cases selected from a plurality of test cases. The test case execution function F30 executes a test defined in selected one or more specific test cases referring to the relation information 30.

The test case execution function F30 reads the test cases 20 and the relation information 30 and executes actual tests. The procedure of executing a test varies with the content of the test. For example, when the procedure of entering the character string "B" in the input field A is manually performed, a manual test is executed. When the procedure of entering the numeric value "C" in the input field A is defined in a program (hereinafter called a test case dedicated program), the test case dedicated program is executed. For example, when all the test cases 20 are defined in a test case dedicated program, all tests are automatically executed by a computer.

The test case execution function F30 reads the test cases 20 and executes tests. Then, the test result output function F40 described below adds the test result to a specific comment line in the source code 10 referring to the relation information 30.

Since the other details of the test case execution function F30 are the same as those of the test case execution function F30 in the software development support program as discussed in FIG. 6, the description of the other details is omitted.

The test result output function F40 is a function of adding the test result of a test case executed or caused to be executed in the test case execution function F30 to source code. Since the details of the test result output function F40 are the same as those of the test result output function F40 in the software development support program as discussed in FIG. 6, the description of the details is omitted.

A software development support program according to a further embodiment of the present invention will next be described in connection with FIG. 8.

Figure 8:
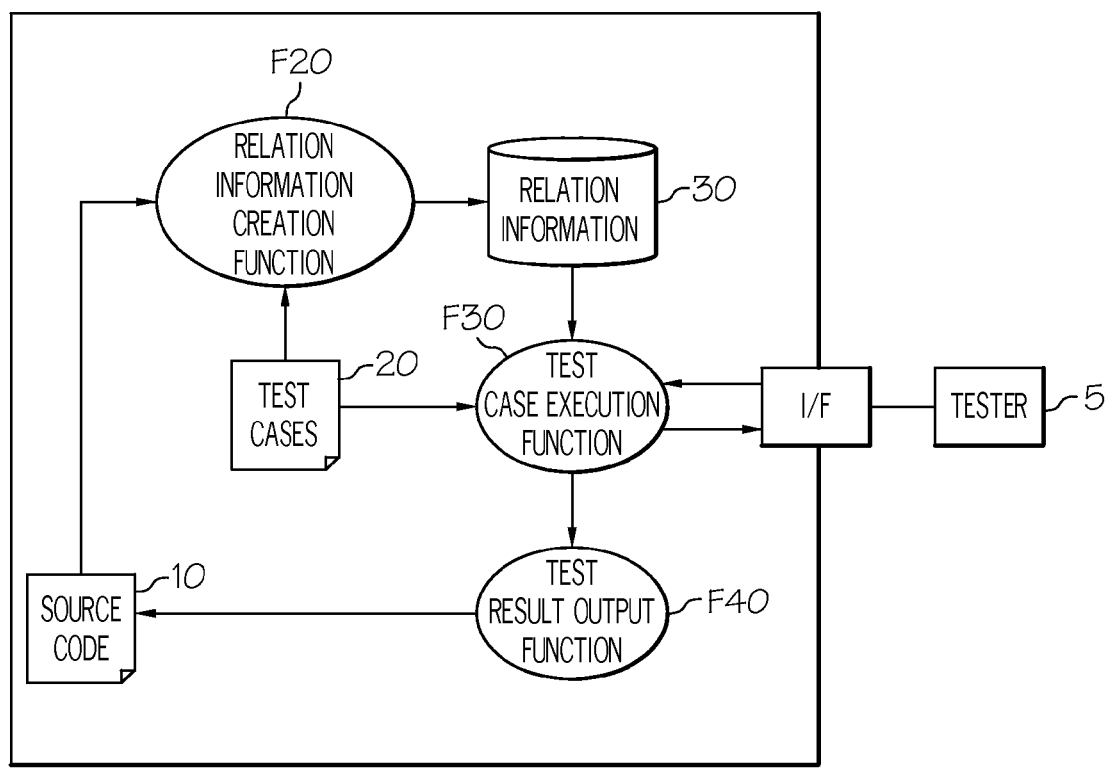
FIG. 8 is a functional block diagram of a software development support program according to the third embodiment of the present invention.

FIG. 8 is a functional block diagram of the software development support program according to a further embodiment of the present invention.

In the following description, the explanation of the same points as those in the respective software development support programs as discussed in FIGS. 6 and 7 is omitted, and different points will be explained.

Referring to FIG. 8, the software development support program according to a further embodiment of the present invention causes a computer to implement the relation information creation function F20, the test case execution function F30, and the test result output function F40.

The relation information creation function F20 is a function of preparing the relation information 30 from the source code 10 and the plurality of test cases 20.

Since the details of the relation information creation function F20 are the same as those of the relation information creation function F20 in the software development support program as discussed in FIG. 7, the description of the details is omitted.

The test case execution function F30 is a function of executing one or more specific test cases selected from a plurality of test cases or causing the specific test cases to be executed. The test case execution function F30 may cause a test defined in one or more specific test cases selected from a plurality of test cases to be executed. The test case execution function F30 causes a test defined in selected one or more specific test cases to be executed, referring to the relation information 30.

According to the procedure defined in selected one or more specific test cases, the test case execution function F30 indicates the test procedure to the tester 5 and causes the tester to enter the test result.

For example, the tester 5 is a person who evaluates a test. In another example, the tester 5 evaluates image data and sound data generated by executing a program using human sense, such as visual sense and hearing sense, and enters the evaluation result. In a further example, the tester 5 has an emulator simulating the operations of an object to be controlled or an object to be controlled by a program. In another example, the tester 5 causes the emulator to operate according to the test procedure and returns the result of the operation.

Since the other details of the test case execution function F30 are the same as those of the test case execution function F30 in the software development support program as discussed in connection with FIG. 6, the description of the other details is omitted.

The test result output function F40 is a function of adding the test result of a test case executed or caused to be executed in the test case execution function F30 to source code. Since the details of the test result output function F40 are the same as those of the test result output function F40 in the software development support program as discussed in connection with FIG. 6, the description of the details is omitted.

A software development support program according to an additional embodiment of the present invention will next be described in connection with FIG. 9.

Figure 9:
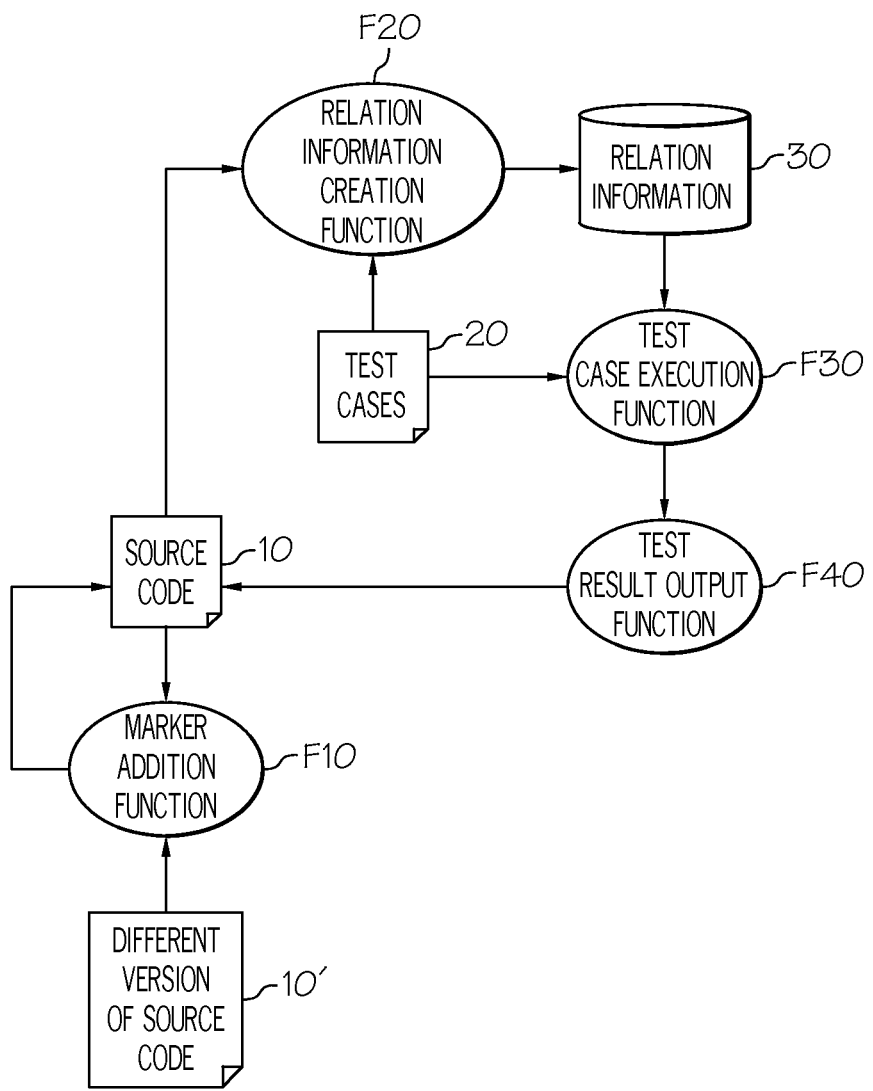
FIG. 9 is a functional block diagram of a software development support program according to the fourth embodiment of the present invention.

FIG. 9 is a functional block diagram of the software development support program according to an additional embodiment of the present invention.

In the following description, the explanation of the same points as those in the respective software development support programs as discussed in FIGS. 6 and 7 is omitted, and different points will be explained.

Referring to FIG. 9, the software development support program according to an additional embodiment of the present invention causes a computer to implement a marker addition function F10, the relation information creation function F20, the test case execution function F30, and the test result output function F40.

The marker addition function F10 is a function of adding a specific comment line including a marker to a portion of the program description field of the source code 10 where a difference lies by comparing two different versions of the source code 10'.

Moreover, the marker addition function F10 may add a specific comment line including a marker to the program description field of a routine including a portion of the program description field of the source code 10 where a difference lies by comparing two different versions of the source code 10'.

Moreover, the marker addition function F10 may display a portion of the program description field of the source code 10 where a difference lies by comparing two different versions of the source code 10', determine a specific routine by interacting with a programmer, and add a specific comment line including a marker to the program description field of the determined specific routine.

For example, the marker addition function F10 may display a portion of the program description field of the source code 10 where a difference lies by comparing a version of the source code 10 to be tested with the previous version of the source code 10, determine a specific routine by interacting with a programmer, and add a specific comment line including a marker to the program description field of the determined specific routine.

Since the relation information creation function F20, the test case execution function F30, and the test result output function F40 are the same as those in the respective software development support programs as discussed in connection with FIGS. 7 and 8, the description of these functions is omitted.

A software development support method, a software development support apparatus, or a software development support program according to an embodiment of the present invention will next be described in connection with FIG. 10, taking a specific example.

Figure 10:
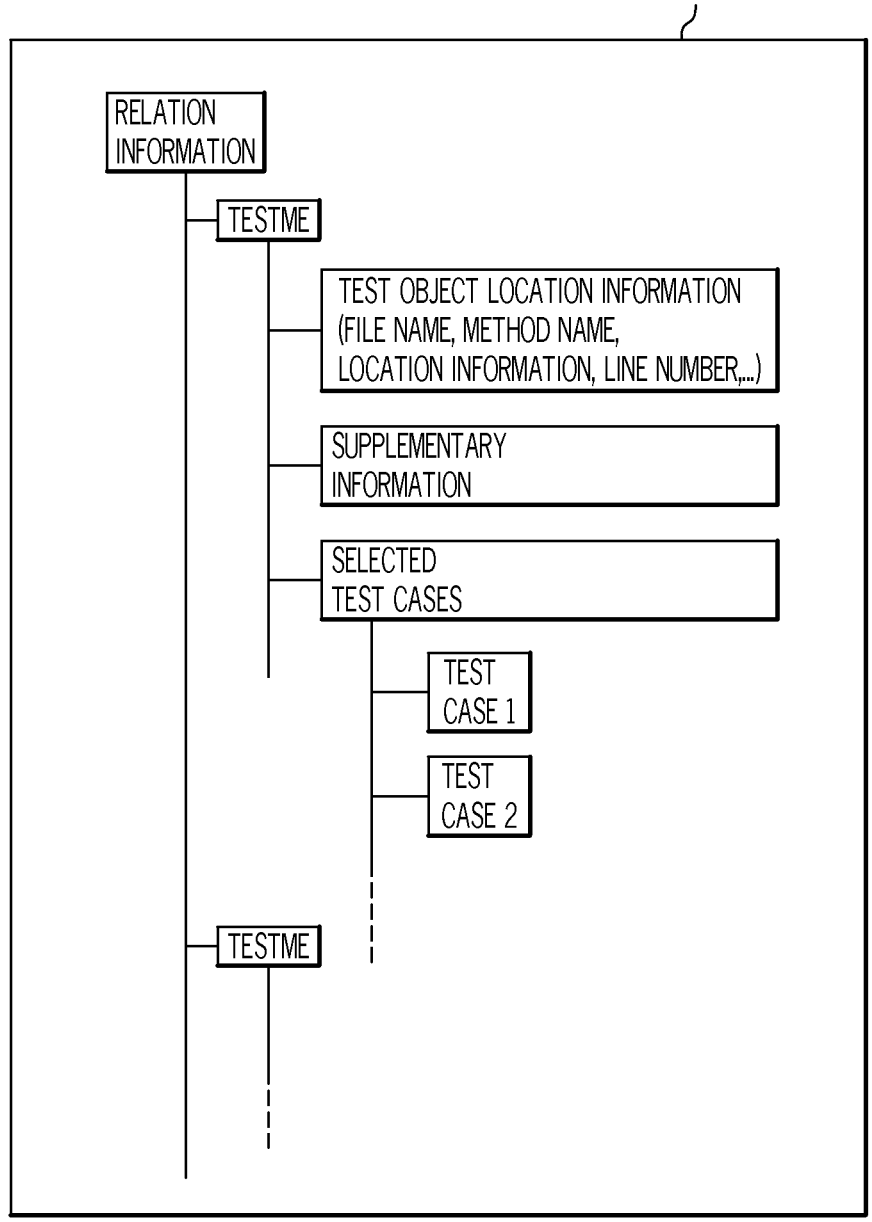
FIG. 10 is a conceptual illustration of the data structure of relation information according to an embodiment of the present invention.
Figure 11:
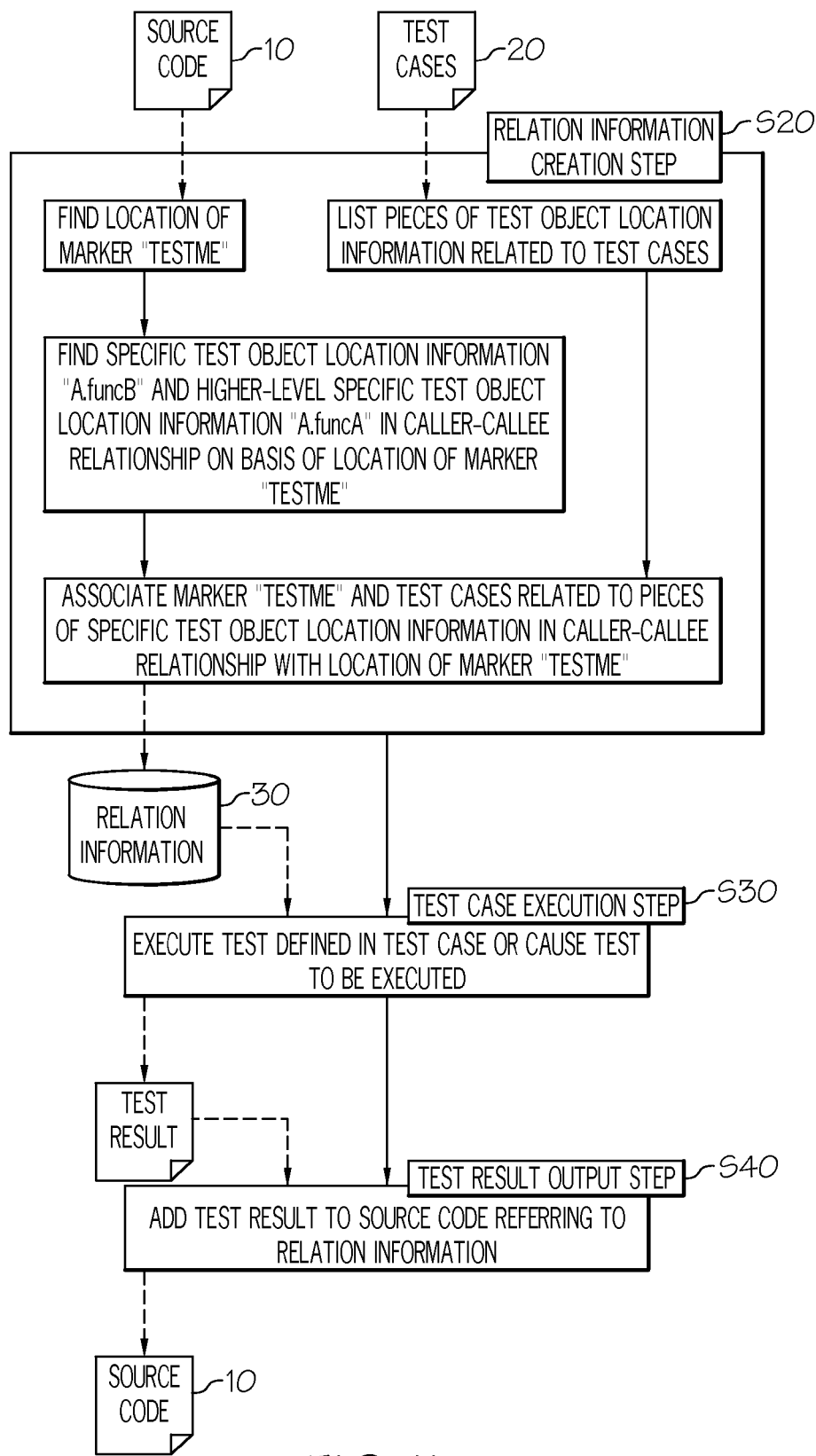
FIG. 11 is a first illustration of an example of a software development support method according to an embodiment of the present invention.
Figure 12:
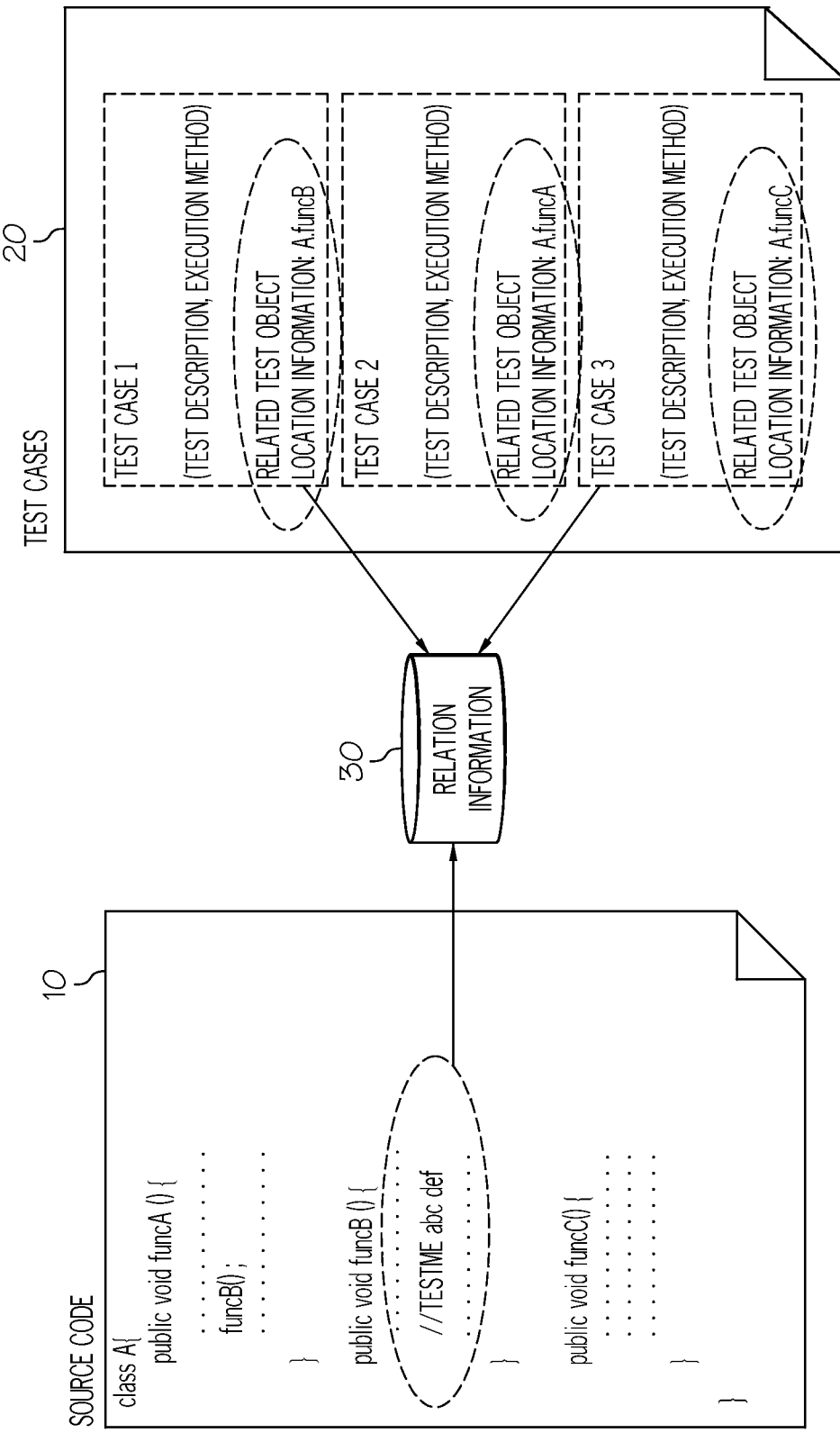
FIG. 12 is a second illustration of the example of the software development support method according to an embodiment of the present invention.
Figure 13:
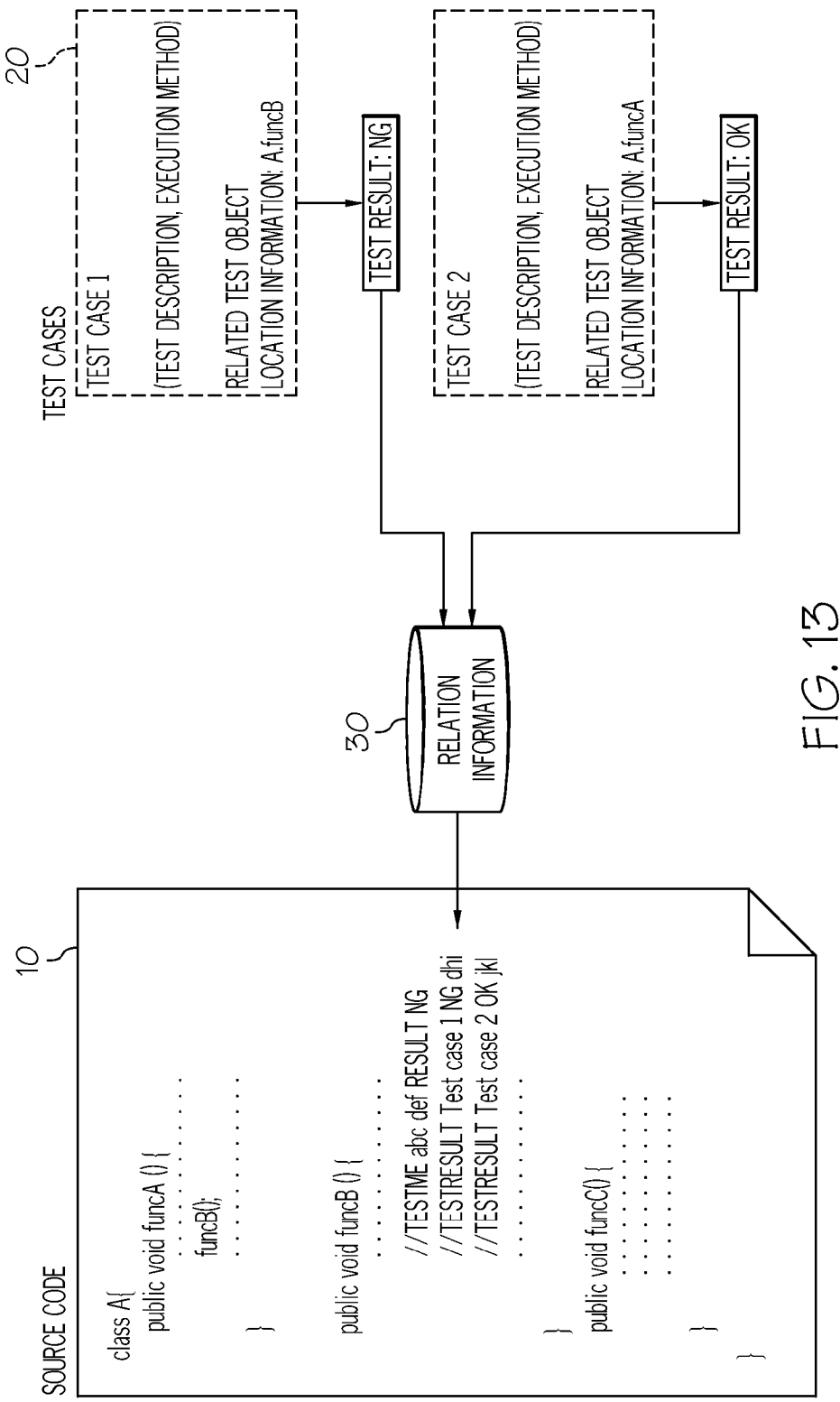
FIG. 13 is a third illustration of the example of the software development support method according to an embodiment of the present invention.

FIG. 10 is a conceptual illustration of the data structure of relation information according to an embodiment of the present invention. FIG. 11 is a first illustration of an example of the software development support method according to an embodiment of the present invention. FIG. 12 is a second illustration of the example of the software development support method according to an embodiment of the present invention. FIG. 13 is a third illustration of the example of the software development support method according to an embodiment of the present invention.

For convenience of explanation, the description will be given, assuming that the program language is JAVA (registered trademark) language, the marker is "TESTME", the supplementary information is "abc", and the test object location information is the combination of a class name and a method name that are program names.

Referring to FIG. 10, FIG. 10 illustrates a data structure of relation information in accordance with an embodiment of the present invention. Each of the plurality of markers "TESTME" is associated with test object location information, supplementary information, and test cases to be executed. Moreover, the test cases to be executed are associated with one or more selected test cases "Test case 1" and "Test case 2".

FIG. 11 illustrates an image of associating the position of a marker with an object to be executed in accordance with an embodiment of the present invention.

Referring to FIG. 11, in conjunction with FIG. 10, the source code 10 and the plurality of test cases 20 are stored in a storage unit. The source code 10 may be manually prepared by a programmer. The source code 10 may be automatically prepared by automatic programming. The test cases 20 may be manually prepared by a programmer. The test cases 20 may be automatically prepared by automatic programming.

(Relation Information Creation Step)

The relation information creation means creates relation information from the source code 10 and the plurality of test cases 20 and stores the relation information in a storage unit.

The relation information creation means finds the location of a comment line including the marker "TESTME" from the program description of the source code 10.

The relation information creation means finds specific test object location information "A.funcB" and higher-level specific test object location information "A.funcA" in the caller-callee relationship on the basis of the location of the marker "TESTME".

The relation information creation means creates relation information by associating the marker "TESTME" and test cases "Test case 1" and "Test case 2" related to the pieces of specific test object location information "A.funcB" and "A.funcA" in the caller-callee relationship with the location of the marker "TESTME".

When the supplementary information "abc" is added to the marker "TESTME", the relation information creation means associates the marker "TESTME" with the supplementary information.

(Test Case Execution Step)

Referring to FIG. 10, in conjunction with FIG. 11, the test case execution means retrieves the test cases "Test case 1" and "Test case 2" from the relation information 30 and executes a test defined in the test case "Test case 1" and a test defined in the test case "Test case 2".

Alternatively, the test case execution means retrieves the test cases "Test case 1" and "Test case 2" from the relation information 30 and causes the test defined in the test case "Test case 1" and the test defined in the test case "Test case 2" to be executed.

The test case execution means receives the test results and records the test results in association with the marker "TESTME" in the program description field of a routine identified by specific test object location information in association with a specific test case.

(Test Result Output Step)

The test result output means adds the test results to the source code referring to the relation information.

The test result output means adds the test results to a comment line including the marker included in the program description field of the routine identified by specific test object location information in association with the specific test case referring to the relation information.

FIG. 12 illustrates the source code and the plurality of test cases 20 having not been subjected to tests in accordance with an embodiment of the present invention.

Referring to FIG. 12, in conjunction with FIGS. 10 and 11, in the program description field of the source code, a method "funcA" that is a routine calls a method "funcB", and a comment line including the marker "TESTME" is described in the method "funcB", which is a routine.

In the plurality of test cases 20, the test case "Test case 1" is associated with the test object location information "A.funcB", the test case "Test case 2" is associated with the test object location information "A.funcA", and a test case "Test case 3" is associated with test object location information "A.funcC".

FIG. 13 illustrates the source code and the plurality of test cases 20 having been subjected to tests in accordance with an embodiment of the present invention.

Referring to FIG. 13, the test result of the test case "Test case 1" is "NG", and the test result of the test case "Test case 2" is "OK".

In this case, the test results are defined in the test cases.

The test results "RESULT NG", "Test case 1 NG dhi", and "Test case 2 OK jkl" are added to specific comment lines of the source code.

Moreover, the software development support method, the software development support apparatus, and the software development support program according to the embodiment of the present invention achieve the following advantageous effects via the components.

A plurality of test cases defining a plurality of respective tests are prepared, a test case selected from the plurality of test cases 20 is executed or caused to be executed, and the result of executing the test is added to the source code 10. Thus, the test result can be checked by seeing the source code 10 having been tested.

Moreover, a plurality of test cases in association with a plurality of respective pieces of test object location information assigned to a plurality of respective routines are prepared, a specific test case in association with test object location information assigned to a specific routine so that the specific routine can be identified is executed or caused to be executed, and the test result is added to a program description field defining the specific routine. Thus, related test results can be checked by seeing the program description field of the source code 10 having been tested.

Moreover, a program description field defining a specific routine includes a specific comment line including a marker, and the specific routine can be identified in the source code 10 on the basis of the specific test object location information. Thus, the specific routine including the specific comment line can be found using the marker as a mark, and the specific test object location information can be found from a single character string or the combination of a plurality of character strings that can identify the specific routine.

Moreover, the respective test results of the specific test cases 20 are added to specific comment lines of the program description field of a specific routine. Thus, the conformity of software to requirements attributable to the specific routine can be checked from the test results added to the specific comment lines.

Moreover, one of the specific test cases 20 in association with higher-level specific test object location information assigned to a higher-level routine calling a specific routine is executed or caused to be executed. Thus, the conformity of software to requirements attributable to the higher-level routine can be checked.

Moreover, a specific comment line includes specific supplementary information regarding a test, and the specific test cases 20 are executed or caused to be executed according to the specific supplementary information. Thus, a test condition can be controlled via the specific supplementary information in the specific comment line.

Moreover, a specific comment line is added to a portion of source code where a difference lies between two different versions of the source code. Thus, the conformity of software to requirements attributable to a rewritten program of the software can be checked.

Moreover, relation information is prepared from the source code 10 and the plurality of test cases 20, and a test is executed on the basis of the relation information to output the test result. Thus, software can be smoothly developed.

Moreover, a plurality of test cases in association with a plurality of respective pieces of test object location information assigned to a plurality of respective routines are prepared, a specific test case in association with test object location information assigned to a specific routine is executed or caused to be executed, and the test result is output in relation to the specific routine. Thus, related test results can be checked by seeing the program description field of source code having been tested.

Moreover, a program description field defining a specific routine includes a specific comment line including a marker, and the specific routine can be identified in source code on the basis of the specific test object location information. Thus, the specific routine including the specific comment line can be found using the marker as a mark, and the specific test object location information can be found from a single character string or the combination of a plurality of character strings that can identify the specific routine.

Moreover, one of the specific test cases in association with higher-level specific test object location information assigned to a higher-level routine calling a specific routine is executed or caused to be executed. Thus, the conformity of software to requirements attributable to the higher-level routine can be checked.

Moreover, a specific comment line includes specific supplementary information regarding a test, and the specific test cases are executed or caused to be executed according to the specific supplementary information. Thus, a test condition can be controlled via the specific supplementary information in the specific comment line.

Moreover, a specific comment line is added to a portion of source code where a difference lies between two different versions of the source code. Thus, the conformity of software to requirements attributable to a rewritten program of the source code can be checked.

Moreover, relation information is prepared from the source code 10 and the plurality of test cases 20, and a test is executed on the basis of the relation information to output the test result. Thus, software can be smoothly developed.

The present invention is not limited to the aforementioned embodiments, and various changes can be made without departing from the spirit of the invention.

While the description has been given taking an example in which a specific test case is associated with a piece of specific test object location information, the present invention is not limited to this example. For example, a plurality of specific test cases may be associated with a piece of specific test object location information. The plurality of specific test cases may be specific test cases for a unit test, a functional test, and an integration test. In this arrangement, a specific test case to be executed can be selected from a plurality of specific test cases in association with a piece of specific test object location information according to supplementary information.

While the description has been given assuming JAVA (registered trademark) language, the language is not limited to this language. For example, the language may be COBOL, FORTRAN, BASIC, PL/I, PASCAL, LISP, C, C++, or another language. In this case, test object location information is selected in a manner that depends on the characteristics of the language.

For example, in the case of FORTRAN, test object location information is a line number, a subroutine name, or the like.

Figure 14:
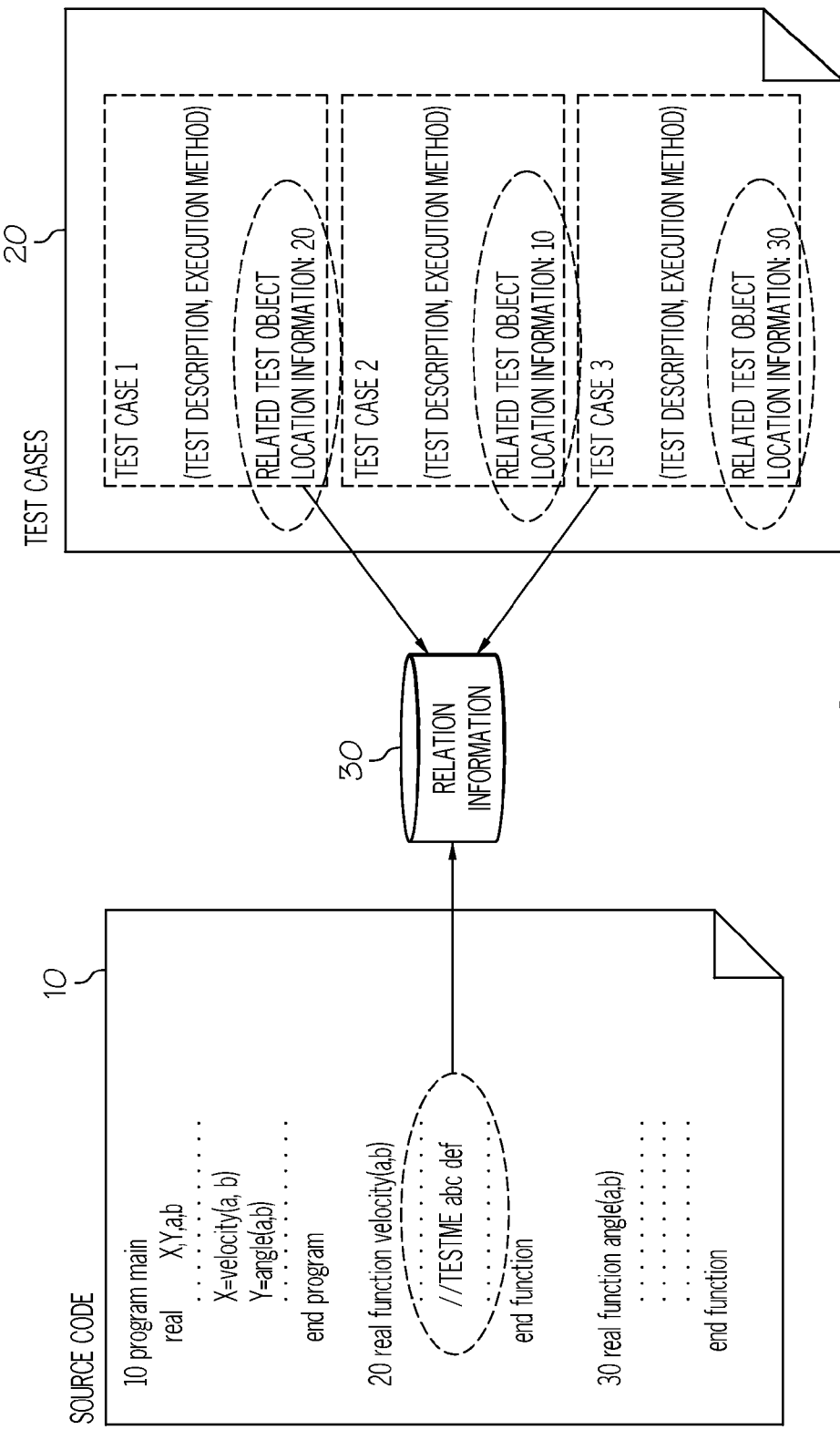
FIG. 14 is a fourth illustration of an example of the software development support method according to an embodiment of the present invention.
Figure 15:
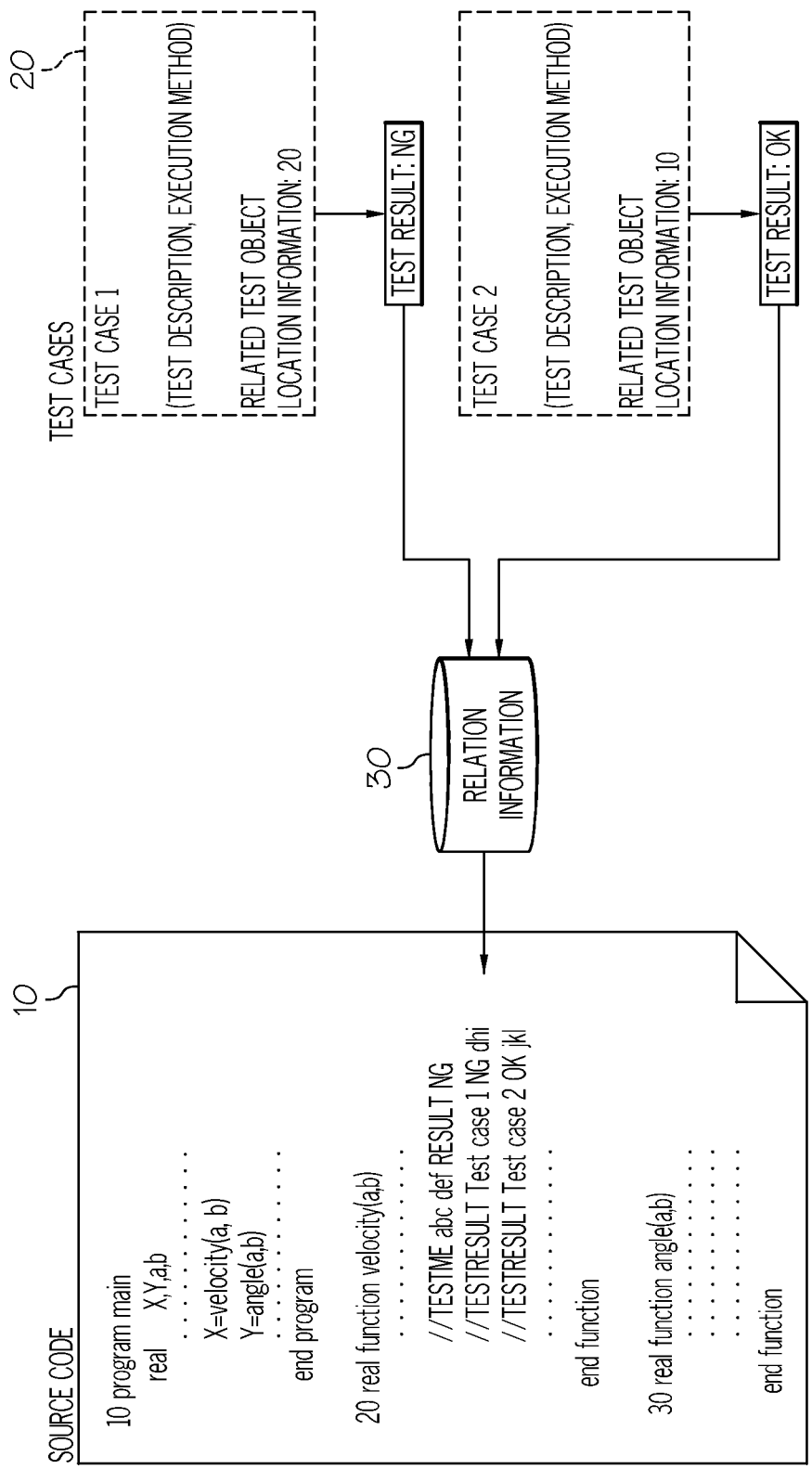
FIG. 15 is a fifth illustration of the example of the software development support method according to an embodiment of the present invention.

FIGS. 14 and 15 illustrate an example in which source code is described in FORTRAN, and a line number is used as test object location information in accordance with an embodiment of the present invention.

REFERENCE SIGNS LIST

Figure 16:
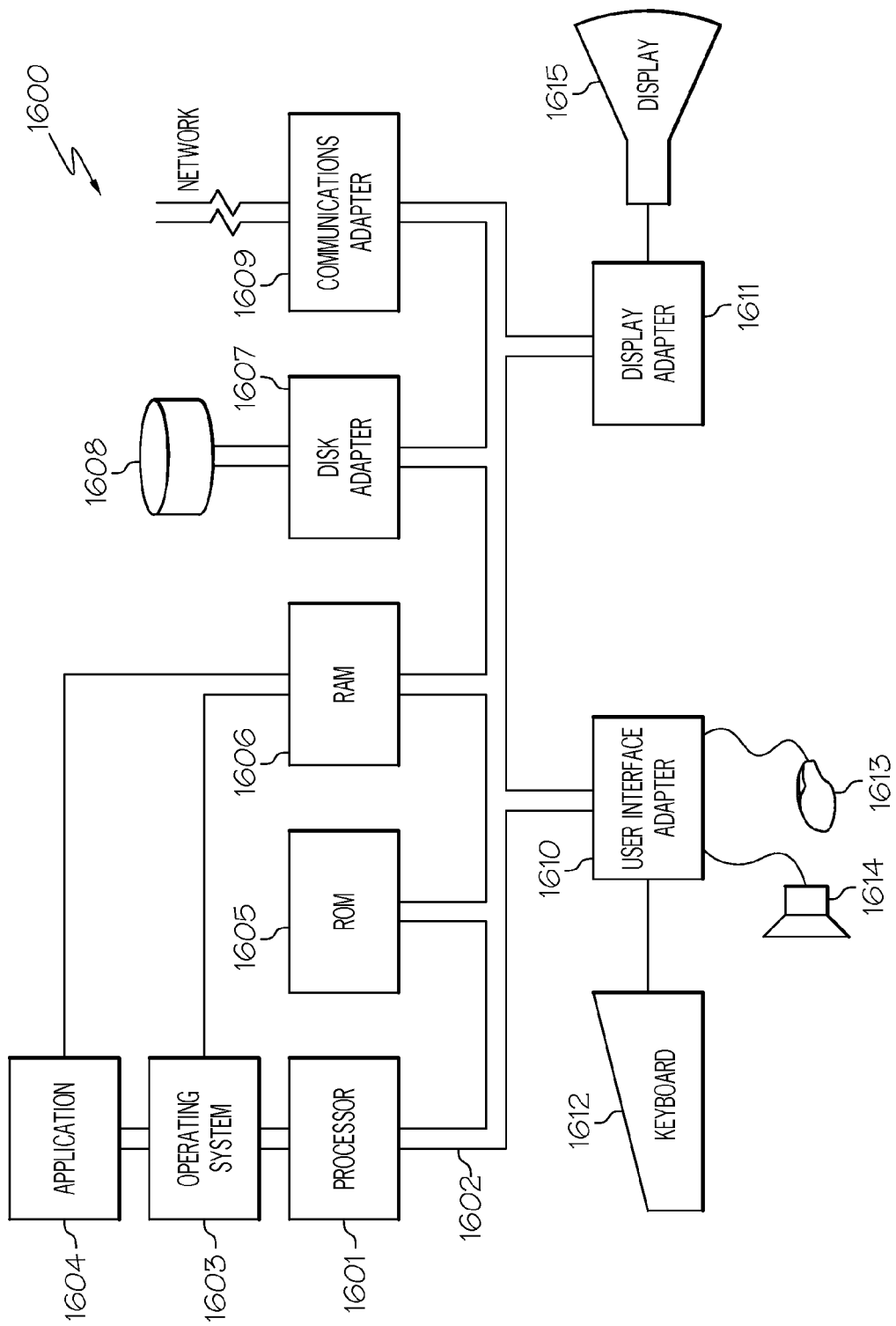
FIG. 16 depicts an embodiment of a hardware configuration of a computer system which is representative of a hardware environment for practicing the present invention.

10: source code
20: test case
30: relation information
S10: marker addition step
S20: relation information creation step
S30: test case execution step
S40: test result output step
F10: marker addition function
F20: relation information creation function
F30: test case execution function
F40: test result output function FIG. 16 depicts an embodiment of a hardware configuration of a computer system 1600 (e.g., computer 501 of FIG. 5) which is representative of a hardware environment for practicing the present invention. Referring to FIG. 16, computer system 1600 has a processor 1601 coupled to various other components by system bus 1602. An operating system 1603 may run on processor 1601 and provide control and coordinate the functions of the various components of FIG. 16. An application 1604 in accordance with the principles of the present invention may run in conjunction with operating system 1603 and provide calls to operating system 1603 where the calls implement the various functions or services to be performed by application 1604. Application 1604 may include, for example, an application for efficiently developing software using test cases to check the conformity of the software to the requirements as discussed above.

Referring again to FIG. 16, read-only memory ("ROM") 1605 may be coupled to system bus 1602 and include a basic input/output system ("BIOS") that controls certain basic functions of computer system 1600. Random access memory ("RAM") 1606 and disk adapter 1607 may also be coupled to system bus 1602. It should be noted that software components including operating system 1603 and application 1604 may be loaded into RAM 1606, which may be computer system's 1600 main memory for execution. Disk adapter 1607 may be an integrated drive electronics ("IDE") adapter that communicates with a disk unit 1608, e.g., disk drive.

Computer system 1600 may further include a communications adapter 1609 coupled to bus 1602. Communications adapter 1609 may interconnect bus 1602 with an outside network (not shown) thereby allowing computer system 1600 to communicate with other similar devices.

I/O devices may also be connected to computer system 1600 via a user interface adapter 1610 and a display adapter 1611. Keyboard 1612, mouse 1613 and speaker 1614 may all be interconnected to bus 1602 through user interface adapter 1610. Data may be inputted to computer system 1600 through any of these devices. A display monitor 1615 may be connected to system bus 1602 by display adapter 1611. In this manner, a user is capable of inputting to computer system 1600 through keyboard 1612 or mouse 1613 and receiving output from computer system 1600 via display 1615 or speaker 1614.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product embodied in a computer readable storage medium, wherein the medium does not include a propagating signal, for supporting creation of source code including a plurality of routines described in a program, using a plurality of test cases defining a plurality of respective tests to be executed to check conformity of software to requirements, the computer program product comprising the programming instructions for:
   a test case execution step of executing one or more specific test cases selected from the plurality of test cases or causing the specific test cases to be executed; and
   a test result output step of adding a test result of a test case executed or caused to be executed in the test case execution step to the source code.

2. The computer program product as recited in claim 1, wherein the plurality of test cases are associated with a plurality of respective pieces of test object location information that can identify the plurality of respective routines in the source code, wherein the specific test cases being ones of the test cases in association with specific test object location information that is test object location information that can identify a specific routine out of the plurality of routines, and wherein the test result output step adds respective test results of the specific test cases executed or caused to be executed in the test case execution step to a program description field of the specific routine identified by the specific test object location information in association with the specific test cases.

3. The computer program product as recited in claim 2, wherein the program description field defining the specific routine includes a specific comment line that is a comment line including a marker that is a specific character string, wherein the specific test object location information includes a single character string or a combination of a plurality of character strings that are selected from a description of the specific routine and can identify the specific routine in the source code.

4. The computer program product as recited in claim 3, wherein the test result output step adds the test results of the specific test cases executed or caused to be executed in the test case execution step to the specific comment line of the program description field defining the specific routine.

5. The computer program product as recited in claim 4, wherein the test case execution step executes a higher-level specific test case that is one of the test cases, the higher-level specific test case being in association with higher-level specific test object location information that is test object location information assigned to a higher-level routine that is a routine calling the specific routine, or causes the higher-level specific test case to be executed.

6. The computer program product as recited in claim 5, wherein the specific comment line includes specific supplementary information regarding a test, wherein the test case execution step executes the specific test cases or causes the specific test cases to be executed according to the specific supplementary information.

7. The computer program product as recited in claim 6 further comprising the programming instructions for:
adding the specific comment line including the marker to a portion of the program description field of the source code where a difference lies by comparing two different versions of the source code.

8. The computer program product as recited in claim 2, wherein the test case execution step executes a higher-level specific test case that is one of the test cases, the higher-level specific test case being in association with higher-level specific test object location information that is test object location information assigned to a higher-level routine that is a routine calling the specific routine, or causes the higher-level specific test case to be executed.

9. The computer program product as recited in claim 3, wherein the specific comment line includes specific supplementary information regarding a test, wherein the test case execution step executes the specific test cases or causes the specific test cases to be executed according to the specific supplementary information.

10. The computer program product as recited in claim 3 further comprising the programming instructions for:
adding the specific comment line including the marker to a portion of the program description field of the source code where a difference lies by comparing two different versions of the source code.

11. A system, comprising:
a memory unit for storing a computer program for supporting creation of source code including a plurality of routines described in a program, using a plurality of test cases defining a plurality of respective tests to be executed to check conformity of software to requirements;
a processor coupled to the memory unit, wherein the processor, responsive to the computer program, comprises:
circuitry for executing, in a test case execution step, one or more specific test cases selected from the plurality of test cases or causing the specific test cases to be executed; and
circuitry for adding, in a test result output step, a test result of a test case executed or caused to be executed in the test case execution step to the source code.

12. The system as recited in claim 11, wherein the plurality of test cases are associated with a plurality of respective pieces of test object location information that can identify the plurality of respective routines in the source code, wherein the specific test cases being ones of the test cases in association with specific test object location information that is test object location information that can identify a specific routine out of the plurality of routines, and wherein the test result output step adds respective test results of the specific test cases executed or caused to be executed in the test case execution step to a program description field of the specific routine identified by the specific test object location information in association with the specific test cases.

13. The system as recited in claim 12, wherein the program description field defining the specific routine includes a specific comment line that is a comment line including a marker that is a specific character string, wherein the specific test object location information includes a single character string or a combination of a plurality of character strings that are selected from a description of the specific routine and can identify the specific routine in the source code.

14. The system as recited in claim 13, wherein the test result output step adds the test results of the specific test cases executed or caused to be executed in the test case execution step to the specific comment line of the program description field defining the specific routine.

15. The system as recited in claim 14, wherein the test case execution step executes a higher-level specific test case that is one of the test cases, the higher-level specific test case being in association with higher-level specific test object location information that is test object location information assigned to a higher-level routine that is a routine calling the specific routine, or causes the higher-level specific test case to be executed.

16. The system as recited in claim 15, wherein the specific comment line includes specific supplementary information regarding a test, wherein the test case execution step executes the specific test cases or causes the specific test cases to be executed according to the specific supplementary information.

17. The system as recited in claim 16, wherein the processor further comprises:
circuitry for adding the specific comment line including the marker to a portion of the program description field of the source code where a difference lies by comparing two different versions of the source code.

18. The system as recited in claim 12, wherein the test case execution step executes a higher-level specific test case that is one of the test cases, the higher-level specific test case being in association with higher-level specific test object location information that is test object location information assigned to a higher-level routine that is a routine calling the specific routine, or causes the higher-level specific test case to be executed.

19. The system as recited in claim 13, wherein the specific comment line includes specific supplementary information regarding a test, wherein the test case execution step executes the specific test cases or causes the specific test cases to be executed according to the specific supplementary information.

20. The system as recited in claim 13, wherein the processor further comprises:
   circuitry for adding the specific comment line including the marker to a portion of the program description field of the source code where a difference lies by comparing two different versions of the source code.

\* \* \* \* \*